(12) United States Patent
Sasaki et al.

(10) Patent No.: US 7,568,375 B2
(45) Date of Patent: Aug. 4, 2009

(54) GAS SENSOR, GAS SENSOR SYSTEM, AND CONTROLLING METHOD THEREOF

(75) Inventors: Takashi Sasaki, Wako (JP); Akihiro Suzuki, Wako (JP); Takashi Saito, Wako (JP); Hidetoshi Oishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 324 days.

(21) Appl. No.: 11/461,185

(22) Filed: Jul. 31, 2006

(65) Prior Publication Data

US 2007/0026275 A1    Feb. 1, 2007

(30) Foreign Application Priority Data

Aug. 1, 2005    (JP)    ............... 2005-223285

(51) Int. Cl.
*G01N 7/00*    (2006.01)
*H01M 8/04*    (2006.01)

(52) U.S. Cl. .......................... 73/23.2; 429/22

(58) Field of Classification Search ............... 73/64.56, 73/23.31, 23.32, 863.71–863.73, 863.81, 73/863.82, 863.86, 23.2; 429/22
See application file for complete search history.

(56) References Cited

U.S. PATENT DOCUMENTS

| | | | | |
|---|---|---|---|---|
| 3,084,554 A * | 4/1963 | Perilloux | .................. | 73/863.73 |
| 3,242,717 A * | 3/1966 | Matle et al. | .................. | 422/90 |
| 3,306,111 A * | 2/1967 | Ferrin | .................. | 73/863.73 |
| 3,429,186 A * | 2/1969 | Price et al. | .................. | 73/863.61 |
| 3,943,775 A * | 3/1976 | De Baun | .................. | 73/432.1 |
| 4,018,089 A * | 4/1977 | Dzula et al. | .................. | 73/863.58 |
| 4,771,772 A * | 9/1988 | DeWitt | .................. | 604/892.1 |
| 4,800,763 A * | 1/1989 | Hakkers et al. | .................. | 73/863 |
| 4,831,559 A * | 5/1989 | Miller | .................. | 702/30 |
| 5,182,940 A * | 2/1993 | Bailey et al. | .................. | 73/36 |
| 5,230,466 A * | 7/1993 | Moriya et al. | .................. | 236/44 A |
| 5,756,360 A * | 5/1998 | Harvey et al. | .................. | 436/179 |
| 5,844,148 A * | 12/1998 | Klein et al. | .................. | 73/863.82 |
| 6,200,819 B1 * | 3/2001 | Harvey et al. | .................. | 436/179 |
| 6,701,794 B2 * | 3/2004 | Mayeaux | .................. | 73/863.23 |
| 6,778,100 B2 * | 8/2004 | Schempf | .................. | 340/870.07 |
| 7,100,427 B2 * | 9/2006 | Kahn et al. | .................. | 73/53.01 |
| 7,240,546 B2 * | 7/2007 | DiFoggio | .................. | 73/152.23 |
| 7,249,000 B2 * | 7/2007 | Kahn et al. | .................. | 702/188 |
| 7,360,395 B2 * | 4/2008 | Sasaki et al. | .................. | 73/25.05 |
| 2004/0168526 A1 * | 9/2004 | Mayeaux | .................. | 73/863.23 |
| 2005/0042141 A1 * | 2/2005 | Otani et al. | .................. | 422/98 |

(Continued)

FOREIGN PATENT DOCUMENTS

JP    06-223850 A    8/1994

(Continued)

*Primary Examiner*—Hezron Williams
*Assistant Examiner*—John Fitzgerald
(74) *Attorney, Agent, or Firm*—Westerman, Hattori, Daniels & Adrian, LLP.

(57) ABSTRACT

A gas sensor disposed on a wall of a gas passage, the gas sensor including: a gas detector detecting a target gas contained in the gas flowing in the gas passage; a detector which houses therein the gas detector and has a gas chamber into which the gas is introduced; and a cutoff valve controlling the introducing of the gas into the gas chamber from the gas passage.

5 Claims, 4 Drawing Sheets

U.S. PATENT DOCUMENTS

2005/0066711 A1* 3/2005 Discenzo ............... 73/64.56
2005/0247114 A1* 11/2005 Kahn et al. ............ 73/53.01
2006/0000298 A1* 1/2006 Thompson et al. ...... 73/863.81
2006/0196254 A1* 9/2006 Fjerdingstad et al. ..... 73/64.56
2006/0219552 A1* 10/2006 Sasaki et al. ............ 204/424

FOREIGN PATENT DOCUMENTS

JP          2004-061244 A     2/2004

* cited by examiner

GAS SENSOR, GAS SENSOR SYSTEM, AND CONTROLLING METHOD THEREOF

BACKGROUND OF THE INVENTION

1. Field of the Invention

The present invention relates to a gas sensor and a gas sensor system that are exposed to a humid condition. Also, the present invention relates to a controlling method of the gas sensor system.

2. Description of Relevant Art

Generally, in a fuel cell which adopts solid polymer electrolyte membrane, a fuel cell stack is configured by stacking a plurality of single cells, which is obtained by sandwiching a membrane electrode assembly by a pair of separators. Here, a membrane electrode assembly is obtained by sandwiching a solid polymer electrolyte membrane, from both sides thereof, by a fuel electrode and an oxygen electrode.

In this fuel cell, hydrogen is supplied, as fuel, to the fuel electrode and air is supplied, as oxidant, to the oxygen electrode. Then, hydrogen ion caused by a catalytic reaction at the fuel electrode passes through the solid polymer electrolyte membrane and reaches to the oxygen electrode. Thus, electric power is generated through an electrochemical reaction between hydrogen ion and oxygen.

In this kind of fuel cell adopting a s solid polymer electrolyte membrane, conventionally, a gas sensor (hydrogen sensor) is provided at an exhaust line of oxygen electrode-side, and a technique, which detects the leakage into the oxygen electrode side of hydrogen through the solid polymer electrolyte membrane from the fuel electrode side using this sensor, has been discovered (see Japanese unexamined patent publications No. H06-223850 and No. 2004-61244).

In these conventional techniques, the gas sensor is disposed on the exhaust line so that a hydrogen intake of the gas sensor is directed to a downside in a vertical direction. Thus, since specific gravity of hydrogen is small, the introducing of hydrogen into the gas sensor is surely achieved.

In these conventional techniques, droplet of water contained in the gas is removed by a water-repellent filter which is provided to the hydrogen inlet, to prevent the adhesion of the droplet of water to a gas detector in the hydrogen sensor.

In these conventional techniques, however, a humid off-gas discharged from the fuel cell is introduced into the gas sensor regardless of the power generation of the fuel cell and the stop of the power generation. In this case, the corrosion (deterioration etc) of the detector may be caused due to the droplet of water that adheres to the gas detector for hydrogen (target gas). Thus, the occurrence of the trouble on the gas sensor is caused sometimes.

Therefore, there have been required the gas sensor and gas sensor system which is resistant to a trouble.

SUMMARY OF THE INVENTION

The present invention relates to a gas sensor disposed on a wall of a gas passage. This gas sensor includes a gas detector which detects a target gas contained in the gas flowing in the gas passage, a detector housing which houses therein the gas detector and has a gas chamber into which the gas is introduced, and a cutoff unit which controls the introducing of the gas into the gas chamber from the gas passage.

According to this gas sensor, the introducing of the gas into the gas chamber from the gas passage can be cutoff appropriately by the cutoff unit. That is, when for example the gas sensor is a hydrogen sensor for detecting hydrogen (target gas) in a humid off-gas of a fuel cell, the introducing of moister into the gas chamber can be prevented, by cutting off the communication between the gas passage and the gas chamber during the stop of the power generation of the fuel cell by the cutoff unit. Thus, since the adhesion of an unfavorable element, e.g. moisture and dew condensation water etc, to the gas detector can be prevented, the gas sensor becomes resistant to a trouble.

In this invention, it is preferable that at least one protrusion, which protrudes into the gas chamber from the wall of the gas chamber, is disposed in the gas chamber.

In the gas sensor having these configurations, since at least one protrusion is provided, the total area of the periphery surfaces which surrounds the gas chamber becomes wide than the gas chamber having the same volume as the present invention's gas chamber. Thus, since humid gas, which includes a target gas and is introduced into the gas chamber, easily contacts with the periphery surfaces, the moisture contained in the humid gas is efficiently condensed. As a result, the adhesion of the moisture to the gas detector can be decreased.

Also, the present invention relates to a gas sensor system which includes the above described gas sensor and a controller. In this gas sensor system, the controller, which controls the motion of the cutoff unit, controls the cutoff unit to introduce the gas into the gas chamber from the gas passage only when measuring the target gas.

According to the gas sensor system having these configurations, since the controller controls the cutoff unit to establish the communication between the gas chamber and the gas passage only when measuring the target gas, by controlling the cutoff unit, the gas is introduced into the gas chamber only when measuring the target gas. Thereby, an exposure time of the gas detector to moisture can be minimized, and thus a life time of the gas detector (gas sensor) can be prolonged.

In this invention, it is preferable that the gas passage is an off-gas line of a fuel cell, the target gas is hydrogen, and the detection of the target gas is performed during the power generation of the fuel cell.

According to this gas sensor system, the communication between the off-gas line of the fuel cell and gas chamber is established by the cutoff unit during the power generation of the fuel cell. Thus, since the off-gas containing hydrogen is introduced into the gas chamber, the detection of hydrogen in off-gas and the monitoring of the hydrogen concentration can be enabled.

On the other hand, the communication between the off-gas line of the fuel cell and gas chamber is cutoff by the cutoff unit during the stop of the power generation of the fuel cell, and thus the off-gas is not introduced into the gas chamber from the off-gas line. Therefore, the continuous introducing of off-gas into the gas chamber and the continuous generation of the dew condensation water in the gas chamber can be prevented, after the stop of the power generation of the fuel cell.

According to the present invention, the gas sensor and the gas sensor system which are resistant to a trouble can be provided.

DETAILED DESCRIPTION OF THE PREFERRED EMBODIMENT

The preferred embodiments of the present invention will be explained with reference to the attached drawings.

Figure 1:
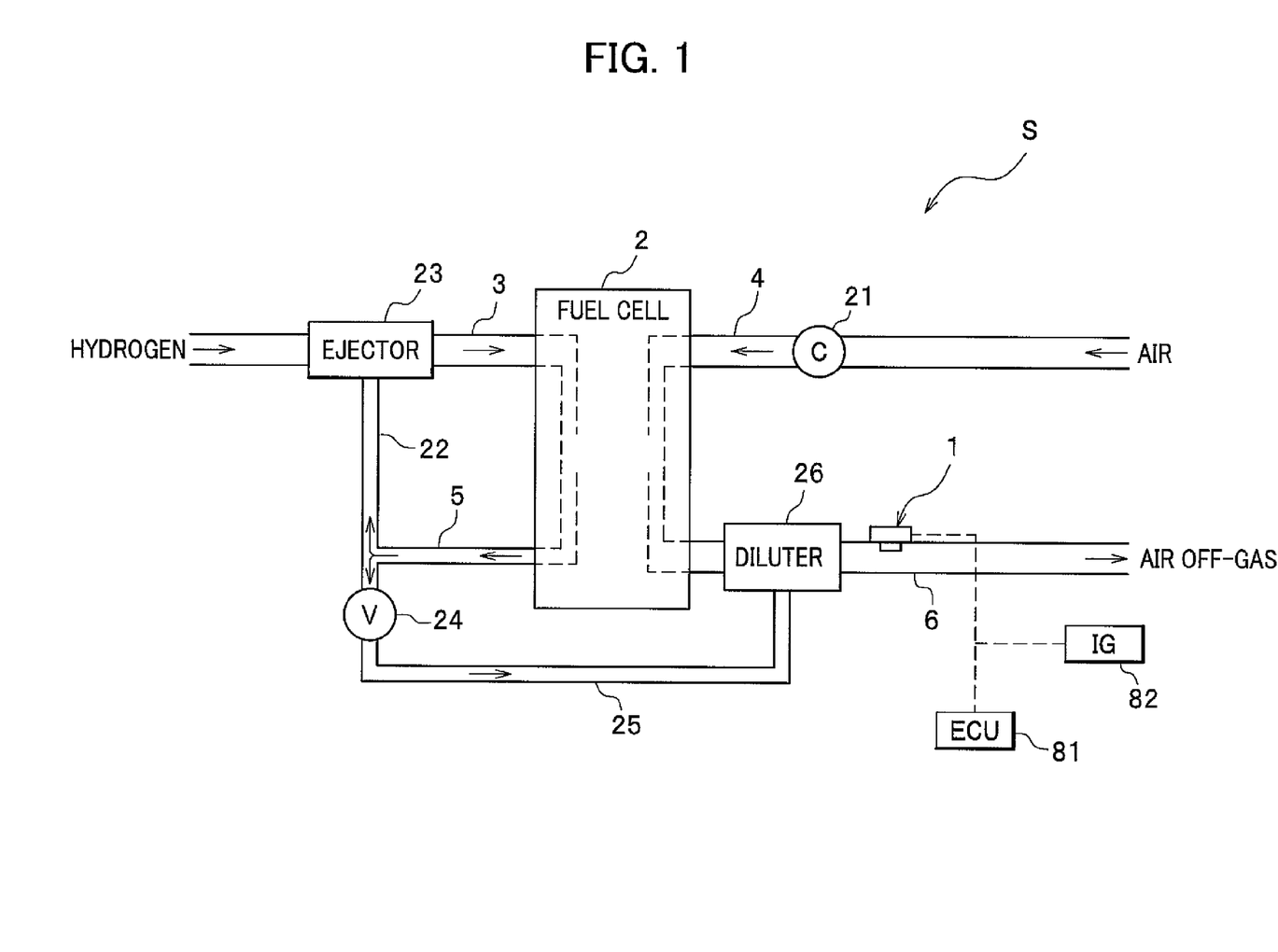
FIG. 1 is a schematic view showing the fuel cell system including a hydrogen sensor of the present embodiment.

As shown in FIG. 1, a hydrogen sensor 1 (gas sensor) according to the present embodiment is installed on a fuel cell systems. The hydrogen sensor 1 detects the hydrogen in off-gas, e.g. air off-gas and a dilution gas, which is discharged from a fuel cell 2. Hereinafter, firstly, the fuel cell system S will be simply explained, and then the hydrogen sensor 1 will be explained in detail.

The fuel cell system S is a system installed on a fuel cell-powered vehicle. In this fuel cell-powered vehicle, an electric-powered motor (drive motor) is driven by a power from a fuel cell 2 for driving a vehicle.

The fuel cell system S mainly includes the fuel cell 2, an anode side inlet line 3, an anode side outlet line 5, a cathode side inlet line 4, and a cathode side outlet line 6.

The anode side inlet line 3 (inlet line 3) and the anode side outlet line 5 (outlet line 5) are the piping disposed at the fuel electrode side of the fuel cell 2, and the cathode side inlet line 3 (inlet line 3) and the cathode side outlet line 6 (outlet line 6) are the piping disposed at the oxygen electrode side of the fuel cell 2.

The fuel cell 2 is formed by stacking one by one a plurality of single cells (not shown). Here, each single cell is obtained by sandwiching membrane electrode assemblies (MEAs) by a pair of separators, and the membrane electrode assemblies (MEAs) is obtained by sandwiching a solid polymer electrolyte membrane, e.g. a cation-exchange membrane, by the fuel electrode and the oxygen electrode.

To this fuel cell 2, hydrogen, which serves as a fuel, is supplied through the inlet line 3 from a hydrogen supply unit (not shown) equipped with a high pressure hydrogen tank, and air, which serves as an oxidant, is supplied through the inlet line 4 by a compressor 21. Then, hydrogen is ionized by a catalytic reaction on a catalytic electrode of the fuel electrode, and causes a hydrogen ion. The hydrogen ion caused by a catalytic reaction passes through the solid polymer electrolyte membrane, which has been humidified appropriately, and reaches to the oxygen electrode. During this transfer of the hydrogen ion within fuel cell, electron passes through an external circuit and is used for the generation of DC electric energy.

Here, since air containing oxygen is supplied to the oxygen electrode, water is caused by an electrical reaction between hydrogen ion, electron, and air, under the action of the catalyst of the oxygen electrode. Then, an off-gas including unreacted gas, e.g. hydrogen, oxygen, and etc., is discharged through the outlet line 5 and the outlet line 6.

Here, hydrogen off-gas (anode off-gas) containing unreacted hydrogen is discharged to a circulation pipeline 22 through the outlet line 5 in the fuel electrode side of the fuel cell 2. Then, hydrogen off-gas is returned to the inlet line 3 through an ejector 23. Thereby, hydrogen contained in off-gas is again supplied to the fuel electrode of the fuel cell 2.

On the contrary, air off-gas (cathode off-gas), i.e. an air containing excessive amount of moisture, is ejected into atmosphere through a diluter 26 and the outlet line 6.

Additionally, one end of a hydrogen exhaust line 25 connects with the outlet line 5 through a purge valve 24 and the other end of the hydrogen exhaust line 25 is connects with the diluter 26. The hydrogen off-gas is allowed to be supplied into the hydrogen exhaust line 25 through the purge valve 24, and is also allowed to be supplied to the diluter 26 through the hydrogen exhaust line 25.

In the diluter 26, the hydrogen off-gas supplied through the hydrogen exhaust line 25 is diluted with the air off-gas supplied through the outlet line 6 by a predetermined dilution rate, and is discharged as a dilution gas.

In this embodiment, off-gas, i.e. air off-gas or dilution gas, flows through the outlet line 6, which is disposed downstream of the diluter 26 and serves as the gas passage A hydrogen sensor 1, which is a catalytic combustion sensor for detecting hydrogen (target gas), is provided on the outlet line 6. The position where the hydrogen sensor 1 is provided is downstream of the diluter 26. Thereby, the checking of the hydrogen concentration in off-gas, i.e. an air off-gas and a dilution gas, is enabled.

The hydrogen sensor 1 is disposed on the outlet line 6, which is disposed so that the flow direction of off-gas is in a horizontal direction. Here, the position where the hydrogen sensor 1 is disposed is at the upper portion in a vertical direction of the outlet line 6. Also, the hydrogen sensor 1 electrically connects with ECU 81 (electric controller), which controls the motion of the fuel cell system S. In other words, the hydrogen sensor 1 electrically connects with ECU 81 which controls electric generation of a fuel cell 2.

The ECU 81 is adapted to work in accordance with the activation of IG (ignition switch) 82 of the fuel cell-powered vehicle. The fuel cell 2 generates electric power when the fuel cell system S is activated by the ignition of IG 82.

The ECU 81 electrically connects with a compressor 35 (an air supply unit) which will be explained later in detail. Then, in order to introduce off-gas into a first chamber 40a (a gas chamber) during the electrical generation of the fuel cell 2, ECU 81 controls a compressor 35 to open a though hole 40b. In other words, the though hole 40b is opened during the detection of hydrogen in order to introduce off-gas into the first chamber 40a (a gas chamber).

<<Configuration of Hydrogen Sensor>>

Next, the detailed configuration of the hydrogen sensor 1 will be explained with reference to FIG. 2. Here, FIG. 2 is a side sectional view of the hydrogen sensor 1.

Figure 2:
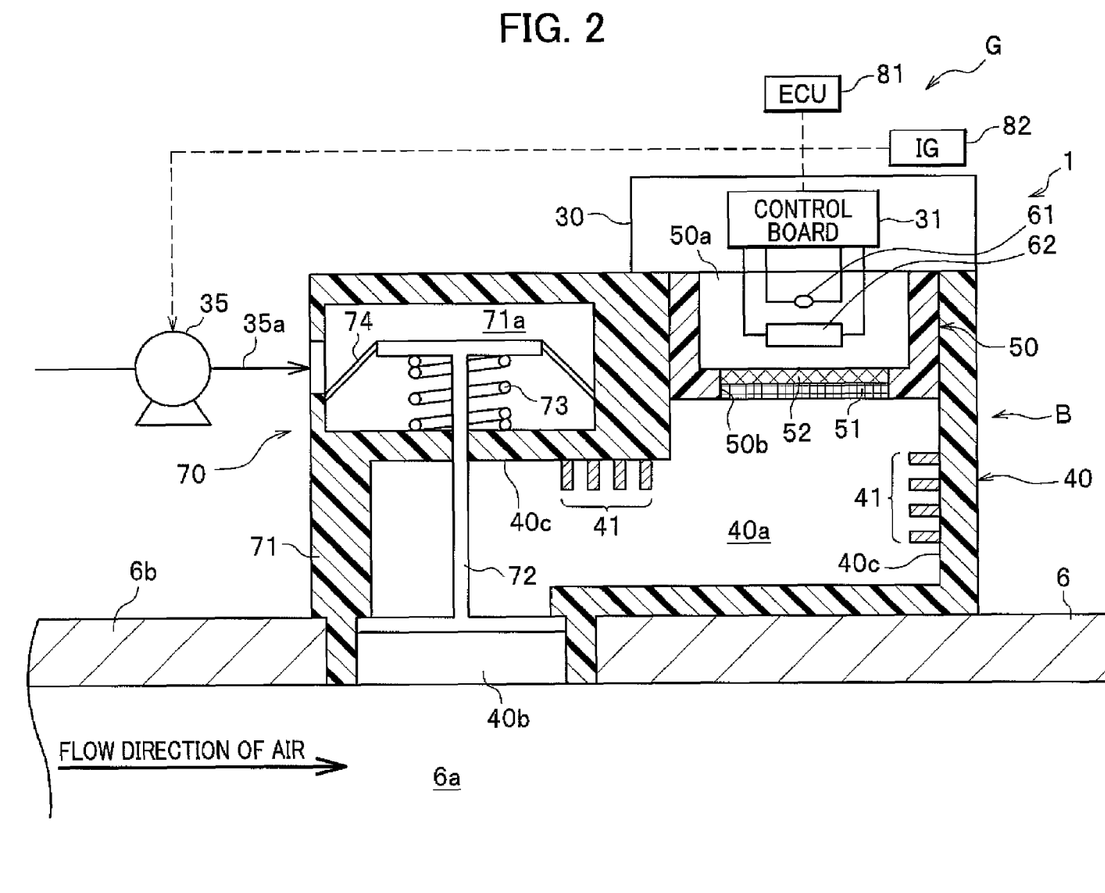
FIG. 2 is a side sectional view of the hydrogen sensor of the present embodiment.

As shown in FIG. 2, the hydrogen sensor 1 mainly includes a casing 30, a gas detector 61, a heater 62, a detector housing B, a plurality of protrusions (ribs) 41, and a diaphragm valve (cutoff valve) 70. Here, protrusions 41 are disposed within a first housing 40 which constitutes the detector housing B. The diaphragm valve 70 shuts off the communication between the first housing 40 and an off-gas line 6a of the outlet line 6.

<Casing>

The casing 30 protects a control board 31 installed in the casing 30, and is for example made of polyphenylene sulfide. The control board 31 electrically connects with the gas detector 61, the heater 62, and ECU 81. An electrical signal determined in accordance with the hydrogen concentration which is detected in the gas detector 61 is supplied to the ECU 81.

The detector housing B is disposed at an underside of the casing 30, and the heater 62 and gas detector 61 which connect with the control board 31 are disposed inside of the detector housing B.

The gas detector 61 is an element for detecting hydrogen contained in off-gas. To be more precise, the gas detector 61 consists of a pair of a detection element and a thermal compensation element. The detection element is a well-know element and is obtained by covering a coil which is formed from a metal wire using a carrier, e.g. alumina, which holds therein a catalyst. In this embodiment, a metal wire, which includes a metal, e.g. platinum etc., whose temperature coefficient against electric resistance is high, is adopted for forming the coil. The catalyst is made of noble metal which is active against a target gas, e.g. hydrogen etc.

The thermal compensation element is inactive against a target gas, and is, for example, obtained by covering the surface of the coil, which is almost equivalent to the detection element, by a carrier, e.g. alumina etc.

When target gas contacts with the catalyst, the temperature of the detection element becomes high due to a reaction heat caused by a catalytic reaction between the target gas and the catalyst. In this case, since the difference between the resistance value of the detection element and the resistance value of the thermal compensation element arises, the concentration of hydrogen can be measured based on this difference. In this embodiment, the influence of the change in the resistance value that is caused depending on an ambient temperature can be cancelled by using the thermal compensation element.

<Heater>

The heater 62 heats the inside of a second housing 50. Hereinafter, the inside space of this second housing 50 is denoted as "second chamber 50a". By disposing the heater 62 to the second chamber 50a, the generation within the second chamber 50a of dew condensation water can be prevented.

<Detector Housing>

The detector housing B is a casing which houses the gas detector 61 and the heater 62 therein. Thus, the gas detector 61 and the heater 62 are surrounded in double by the detector housing B and the second housing 50. The detector housing B includes the first housing 40, which is disposed at outermost part, and the second housing 50, which is disposed inside in an upper portion of the first housing 40 (detector housing).

[First Housing]

The first housing 40 is a casing which is disposed at underside of the casing 30 and protrudes downward from the underside of the casing 30. The first housing 40 is appropriately fixed to a peripheral wall 6b of the outlet line 6 using a bolt etc.

The first housing 40 has a first chamber 40a (gas chamber) into which off-gas is introduced, and first chamber 40a communicates with off-gas line 6a in the outlet line 6 via the though hole 40b. Here, it is preferable that the volume of the first chamber 40a is as small as possible for decreasing the amount of off-gas introduced into the first chamber 40a.

A plurality of protrusions (ribs) 41 are disposed on an inner surface 40c of the first housing 40 which surrounds the first chamber 40a, and each protrusion (rib) protrudes to the inside of the first chamber 40a. Thereby, in this embodiment, the area of the periphery surfaces which surround the first chamber 40a is large.

Therefore, since the contact area between the periphery surfaces and the off-gas introduced into the first chamber 40a becomes large, the surface condensation of moisture contained in off-gas is easily caused. As a result, since large amount of moisture contained in the off-gas is trapped by the periphery surfaces, the adhesion of moisture to the gas detector 61 can be decreased.

[Second Housing]

The second housing 50 is a bottomed cylinder which houses therein the gas detector 61 and the heater 62, and is disposed inside of the first housing 40. A though hole 50b is formed on the bottom wall of the second housing 50. A filter obtained by stacking a water-repellent filter 51 and an explosion-proof filter 52 is disposed so as to close the though hole 50b.

The water-repellent filter 51 is resistant to penetration of fluid but allows the penetration of gas. Thereby, gas, e.g. hydrogen and air, is selectively introduced into the second chamber 50a while preventing the intrusion of fluid, e.g. dew condensation water, into the second chamber 50a.

The explosion-proof filter 52 is a mesh etc for ensuring the explosion proof function, and is disposed inside than the water-repellent filter 51 (near the gas detector 61 than the water-repellent filter 51).

<Diaphragm Valve>

The diaphragm valve 70 cuts off the intrusion of off-gas, e.g. air off-gas and dilution gas, into the first chamber 40a from the off-gas line 6a, by closing as appropriate the though hole 40b. The diaphragm valve 70 includes a valve casing 71, a valve 72, a compression coil spring 73, and a diaphragm seal 74. The valve casing 71 constitutes a part of the first housing 40, the diaphragm valve 70 opens and closes the though hole 40b, the compression coil spring 73 pushes the valve 72 to close the through hole 40b, and the diaphragm seal 74 is fixed to the valve 72 and divides a valve chamber 71a into two spaces. Here, FIG. 2 shows the state where the compression coil spring 73 is expanded and the opening is closed by the valve 72.

When the operation signal is supplied to the compressor 35 from ECU 81 and the compressor 35 is actuated, a compressed air is supplied into the valve chamber 71a through a piping 35a. Then, the force caused by the compressed air is applied to the valve 72 and thus the valve 72 is moved downside in FIG. 2 against a spring force given by the compression coil spring 73. Thereby, the though hole 40b is opened.

When the though hole 40b is opened, since the first chamber 40a communicates with the off-gas line 6a, the off-gas is introduced into the first chamber 40a.

In this embodiment, the compressor 35 and the compressor 21 (see FIG. 1), which is used for supplying air to the cathode of the fuel cell 2, are separately provided. However, the compressor 21 may have the function of the compressor 35. In this case, the supply of the compressed air into the valve chamber 71a can be achieved by providing a branch line, which connects the inlet line 4 with the valve chamber 71a and by controlling an open-and-close valve, which is provided on the branch line, in accordance with the command from ECU 81.

Additionally, the open-and-close of the valve 72 may be performed, in accordance with the command from ECU 81, by an electromagnetic drive using a solenoide.

Here, in this embodiment, the gas sensor system includes the hydrogen sensor 1 (gas sensor) and ECU 81 (controller).

<<Function and Benefit of Hydrogen Sensor>>

Next, the function of the hydrogen sensor 1 will be explained with reference to the control flow chart established on ECU 81 of FIG. 3 in addition to FIG. 1 and FIG. 2. Here, the explanation is made in order of: power generation of fuel cell 2; and the stop of power generation.

<Power Generation of Fuel Cell>

When IG 82 is turned on for driving a fuel cell-powered vehicle, ECU 81 activates the fuel cell system S. That is, ECU 81 causes the power generation of the fuel cell 2.

Figure 3:
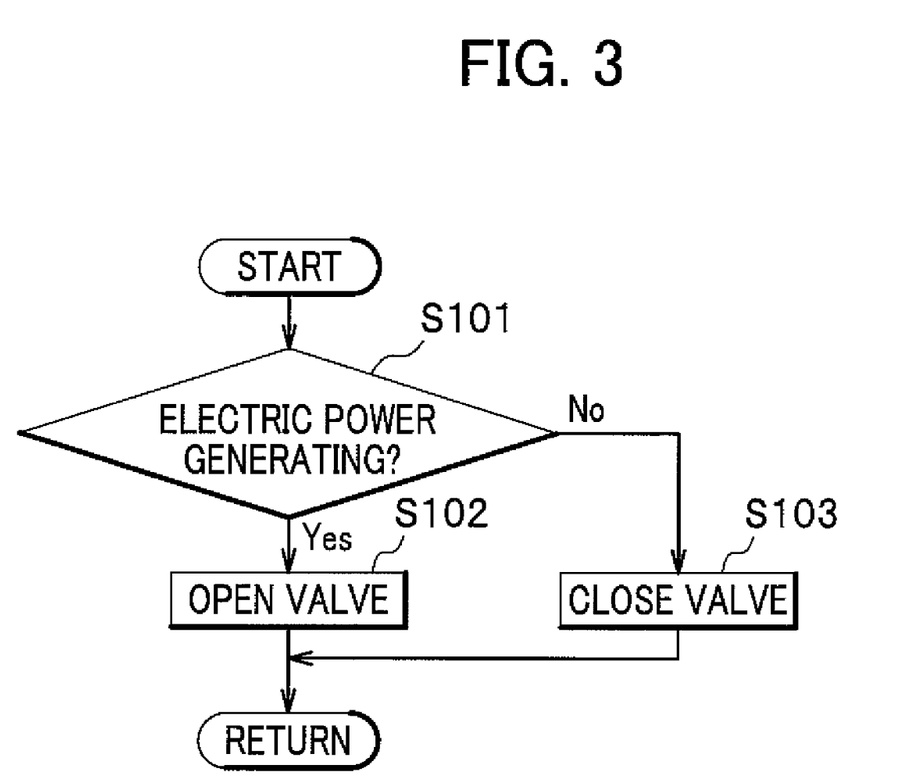
FIG. 3 is a flow chart being established to the control board of FIG. 2

When the fuel cell 2 generates an electric power, the judgment at step S101 of FIG. 3 becomes "Yes", and the processing in ECU 81 proceeds to step S102.

In step S102, ECU 81 opens the diaphragm valve 70. To be more precise, ECU 81 actuates the compressor 35 to supply a compressed air to the valve chamber 71a. Thus, the valve 72 is pushed in a downside direction and the through hole 40b is opened. When the through hole 40b is opened, the off-gas, e.g. air off-gas and dilution gas, in the off-gas line 6a is introduced into the first chamber 40a.

A part of off-gas intruded into the first chamber 40a penetrates the water-repellent filter 51 and the explosion-proof filter 52, and then flows into the second chamber 50a. Thereby, hydrogen concentration is detected by the gas detector 61.

The off-gas, introduced into the first chamber 40a, comes in contact with periphery surfaces surrounding the first chamber 40a. Here, the term "periphery surfaces" means the inside surface of the first chamber 40a and the surface of each protrusions 41 disposed in the first chamber 40a.

In this embodiment, as described above, since protrusions 41 are disposed within the first chamber 40a, the total area of periphery surface is increased. This provides the contact between off-gas and periphery surface with high probability, and thus the temperature of off-gas, intruded into the first chamber 40, efficiently becomes low. Thereby, moisture being contained in off-gas causes a surface condensation.

Therefore, since large amount of moisture in off-gas is captured in the first chamber 40a, the adhesion of moisture on the gas detector 61 that is cased after the penetration of water-repellent filter 51 can be prevented. After this, the processing in ECU 81 proceeds to "Return" and the processing backs to "Start".

<Stop of Power Generation on Fuel Cell>

On the other hand, when IG 82 is turned off to stop the power generation of the fuel cell-powered vehicle, the operation of the fuel cell system S is stopped by ECU 81. That is, the fuel cell 2 stops the power generation. When the power generation of the fuel cell 2 is stopped, the judgment at step S101 becomes "No", and the processing proceeds to step S103.

In step S103, ECU 81 closes the diaphragm valve 70. To be more precise, ECU 81 stops the compressor 35 and thereby the supply of a compressed air to the valve chamber 71a is stopped. Thus, the compression coil spring 73 is elongated and the valve 72 is pushed in an upward direction, and thereby the through hole 40b is closed. That is, the communication between the first chamber 40a and the outlet line 6 is cut off.

When the communication is cut off, the continuous intrusion of off-gas into the first chamber 40a is stopped in accordance with the stop of the power generation of the fuel cell 2. Thereby, the continuous generation of the dew condensation water in the first chamber 40a can be prevented, after the stop of the power generation of the fuel cell 2. As a result of this, the occurrence of the failure due to the droplet of water on the hydrogen sensor 1 can be prevented.

Although there have been disclosed what are the patent embodiment of the invention, it will be understood by person skilled in the art that variations and modifications may be made thereto without departing from the scope of the invention, which is indicated by the appended claims.

In the above described embodiment, the explanation has been made on assumption that the target gas is hydrogen. However, target gas is not limited to hydrogen, and other kinds of gas, e.g. carbon monoxide, hydrogen sulfide, and etc., can be adoptable as the target gas. Additionally, in the above described embodiment, a catalytic combustion type gas sensor is adopted as the gas sensor, but other types of sensor, e.g. a semiconductor type gas sensor, can be adoptable.

In the above described embodiment, the hydrogen sensor 1 (gas sensor) is disposed on the outlet line 6 which is provided at downstream of the diluter 26. The position of the hydrogen sensor is not limited to this position. For example, the hydrogen sensor may be disposed on the hydrogen exhaust line 25 which is provided between the purge valve 24 and the diluter 26.

Figure 4:
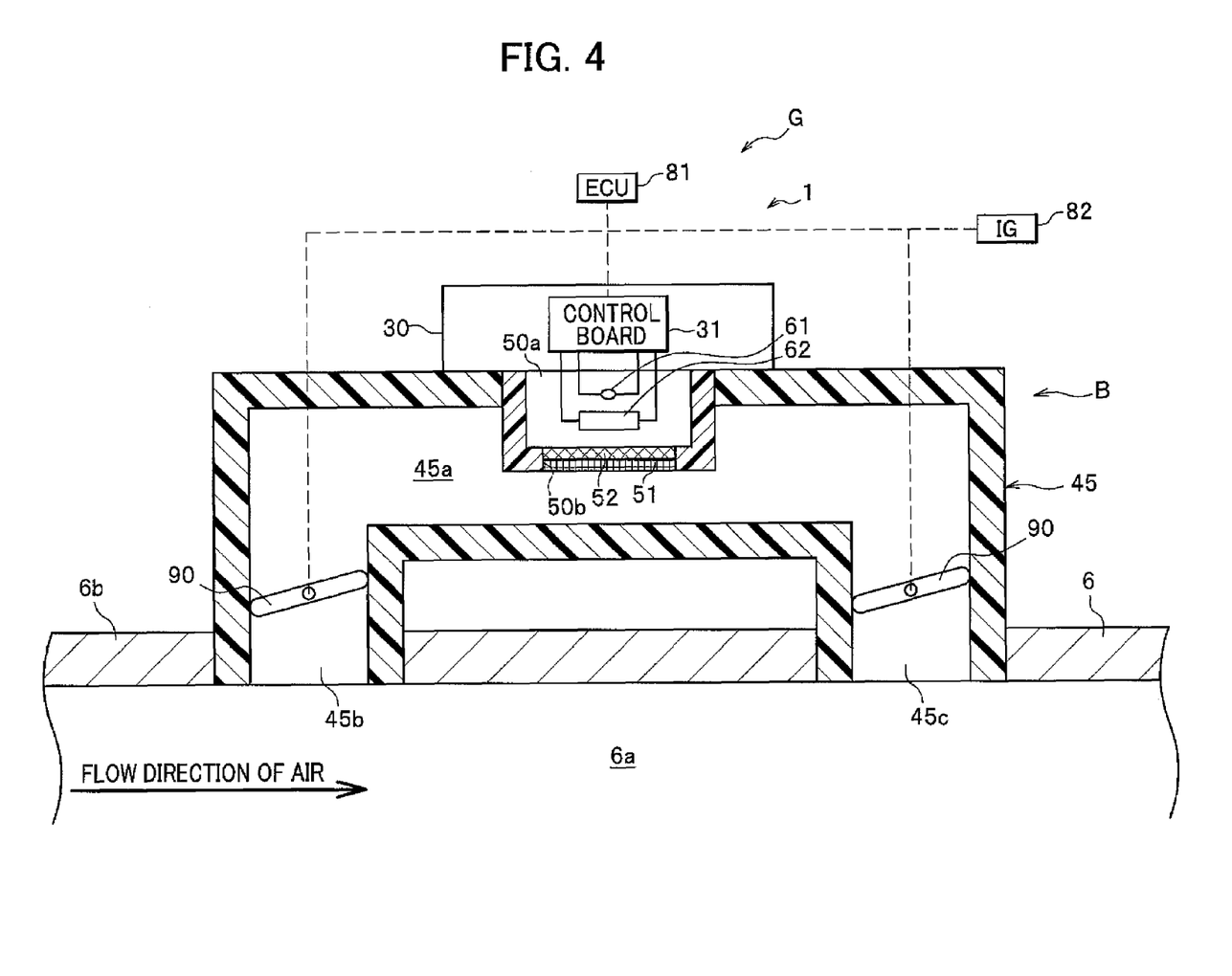
FIG. 4 is a side sectional view of the hydrogen sensor of the other embodiment.

In the above embodiment, as shown in FIG. 2, the first housing 40 has one through hole 40b, and this through hole 40b functions as an inlet and outlet for off-gas. However, the configuration as shown in FIG. 4 may be adoptable instead of the configuration shown in FIG. 2.

In this case, the first chamber 45a is provided instead of the first chamber 40 of the above described embodiment, and an inlet 45b and an outlet 45c is separately provided on the first chamber 45a.

In this case, a butterfly valve 90 is disposed in the vicinity of each of the inlet 45b and outlet 45c. The communication between the first chamber 45a and off-gas line 6a can be shut off when each butterfly valve 90 is closed by ECU 81.

What is claimed is:

1. A gas sensor system comprising:
   a gas sensor disposed on a wall of a gas passage, the gas sensor comprising:
      a gas detector detecting a target gas contained in the gas flowing in the gas passage;
      a detector housing which houses therein the gas detector and has a gas chamber into which the gas is introduced; and
      a cutoff unit controlling the introduction of the gas into the gas chamber from the gas passage; and
   a controller controlling the motion of the cutoff unit, wherein the controller controls a cutoff valve to introduce the gas into the gas chamber from the gas passage only when measuring the target gas;
   wherein the gas passage is an off-gas line of a fuel cell, the target gas is hydrogen, and the detection of the target gas is performed during the power generation of the fuel cell.

2. A gas sensor system comprising:
   a gas sensor disposed on a wall of a gas passage, the gas sensor comprising:
      a gas detector detecting a target gas contained in the gas flowing in the gas passage;
      a detector housing which houses therein the gas detector and has a gas chamber into which the gas is introduced;
      a cutoff unit controlling the introduction of the gas into the gas chamber from the gas passage; and
      at least one protrusion which protrudes into the gas chamber from the wall of the gas chamber; and
   a controller controlling the cutoff unit, wherein the controller controls a cutoff valve to introduce the gas into the gas chamber from the gas passage only when measuring the target gas;
   wherein the gas passage is an off-gas line of the fuel cell, the target gas is hydrogen, and the detection of the target gas is performed during the power generation of the fuel cell.

3. A method for controlling a gas sensor system including a gas detector, a gas chamber, a cutoff valve, and a controller, the method comprising the steps of:
   controlling, by the controller, the cutoff valve to introduce the gas into the gas chamber from a gas passage;
   detecting, by the gas detector, a target gas contained in the gas introduced into the gas chamber, wherein
   the controller introduces the gas into the gas chamber from the gas passage only when measuring the target gas by controlling the cutoff valve;

wherein the gas passage is an off-gas line of a fuel cell, the target gas is hydrogen, and the detection of the target gas is performed during the power generation of the fuel cell.

4. A gas sensor system for detecting a target gas contained in air flowing through a gas passage, the gas sensor system comprising:

a gas detector which detects a target gas;

a detector housing in which the gas is introduced;

a gas chamber which is disposed in the detector housing and houses therein the gas detector;

an intrusion controller which is disposed at a connection hole between the detector housing and the gas chamber and which limits the intrusion of moisture contained in gas into the gas chamber;

a cutoff unit which performs an opening and closing of a through hole between the gas passage and the detector housing; and a controller which controls the motion of the cutoff unit;

wherein the cutoff unit includes:

a valve for opening and closing the through hole, a spring member which pushes the valve in a direction closing the through hole, and closes the through hole with one end of the valve, a housing which houses therein the spring member and the other end of the valve, and a compressed air supply unit which supplies compressed air into the housing to move the valve in a direction opening the through hole by the compressed air.

5. A gas sensor system for detecting a target gas contained in air flowing through a gas passage, the gas sensor system comprising:

a gas detector which detects a target gas;

a detector housing in which the gas is introduced;

a gas chamber which is disposed in the detector housing and houses therein the gas detector;

an intrusion controller which is disposed at a connection hole between the detector housing and the gas chamber and which limits the intrusion of moisture contained in gas into the gas chamber;

a cutoff unit which performs an opening and closing of a through hole between the gas passage and the detector housing; and a controller which controls the motion of the cutoff unit;

wherein the gas passage is an off-gas line of a fuel cell, the target gas is hydrogen, and the detection of the target gas is performed during the power generation of the fuel cell.

\* \* \* \* \*